US008664461B2

(12) United States Patent
Harrington et al.

(10) Patent No.: US 8,664,461 B2
(45) Date of Patent: Mar. 4, 2014

(54) CATALYSTS FOR PRODUCING POLYALPHA-OLEFINS AND PROCESSES RELATED THERETO

(75) Inventors: Bruce A. Harrington, Houston, TX (US); Abhimanyu O. Patil, Westfield, NJ (US); Donna J. Crowther, Seabrook, TX (US); Phillip T. Matsunaga, Houston, TX (US); Kevin B. Stavens, Houston, TX (US); Catalina L. Coker, Baytown, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/423,686

(22) Filed: Mar. 19, 2012

(65) Prior Publication Data

US 2013/0245213 A1    Sep. 19, 2013

(51) Int. Cl.
*C07C 2/08* (2006.01)
*C07C 2/34* (2006.01)
*C08F 4/6592* (2006.01)

(52) U.S. Cl.
USPC ........... 585/524; 585/523; 585/527; 526/160; 526/943

(58) Field of Classification Search
USPC .......... 585/523, 524, 527, 160, 943; 526/160, 526/943
See application file for complete search history.

(56) References Cited

U.S. PATENT DOCUMENTS

| | | | |
|---|---|---|---|
| 4,704,491 A | 11/1987 | Tsutsui et al. | |
| 5,043,515 A | 8/1991 | Slaugh et al. | |
| 5,087,788 A | 2/1992 | Wu | |
| 5,171,919 A | 12/1992 | Watanabe et al. | |
| 5,688,887 A | 11/1997 | Bagheri et al. | |
| 6,043,401 A | 3/2000 | Bagheri et al. | |
| 6,133,209 A | 10/2000 | Rath et al. | |
| 6,414,090 B2 | 7/2002 | Minami et al. | |
| 6,414,091 B2 | 7/2002 | Moritomi et al. | |
| 6,548,723 B2 | 4/2003 | Bagheri et al. | |
| 6,548,724 B2 | 4/2003 | Bagheri et al. | |
| 6,680,417 B2 | 1/2004 | Bagheri et al. | |
| 6,706,828 B2 | 3/2004 | DiMaio | |
| 6,713,438 B1 | 3/2004 | Baillargeon et al. | |
| 7,056,995 B2 | 6/2006 | Deckers et al. | |
| 7,141,527 B1 | 11/2006 | Van Baar et al. | |
| 7,279,609 B2 | 10/2007 | Mihan | |
| RE40,234 E | 4/2008 | Canich | |
| 7,842,829 B2 | 11/2010 | Hillairet et al. | |
| 7,868,108 B2 | 1/2011 | Mihan et al. | |
| 7,932,331 B2 | 4/2011 | Hillairet et al. | |
| 8,088,704 B2 | 1/2012 | Kolb et al. | |
| 2004/0038806 A1 | 2/2004 | Moman et al. | |
| 2004/0097772 A1 | 5/2004 | Deckers et al. | |
| 2004/0242814 A1 * | 12/2004 | Kacker et al. | 526/161 |
| 2005/0176901 A1 * | 8/2005 | Arai et al. | 526/127 |
| 2006/0183631 A1 | 8/2006 | Lee et al. | |
| 2009/0036621 A1 | 2/2009 | Jacobsen et al. | |

FOREIGN PATENT DOCUMENTS

| | | |
|---|---|---|
| EP | 0 283 958 | 9/1996 |
| WO | 97/23493 | 7/1997 |
| WO | 97/42232 | 11/1997 |
| WO | 01/21675 | 3/2001 |
| WO | 03/020856 | 3/2003 |
| WO | WO 03/091265 | 11/2003 |
| WO | WO 2004/031250 | 4/2004 |
| WO | WO 2006/065844 | 6/2006 |

OTHER PUBLICATIONS

J. Saβmannshausen et al., J. Organometallic Chemistry, 1999, 592, pp. 84-94.

* cited by examiner

*Primary Examiner* — Caixia Lu
(74) *Attorney, Agent, or Firm* — Leandro Archederra, III; Luke A. Parsons

(57) ABSTRACT

This invention is directed to new mono-cyclopentadienyl ("mono-Cp") metallocene catalyst compounds useful for producing high viscosity PAOs with narrow molecular weight distribution and good shear stability. Specifically, this invention relates to a group of bridged mono-Cp catalysts wherein, in an embodiment of the invention, the aromatic ring structure is substituted with: 1) at least one phenyl group, 2) at least one alkyl group, and 3) at least one other group, such as a hydrocarbyl group, a heteroatom, or a heteroatom-containing group.

15 Claims, No Drawings

CATALYSTS FOR PRODUCING POLYALPHA-OLEFINS AND PROCESSES RELATED THERETO

FIELD OF THE INVENTION

This disclosure relates to new mono-cyclopentadienyl ("mono-Cp") metallocene catalyst compounds useful for producing high viscosity polyalpha-olefins (PAOs).

BACKGROUND OF THE INVENTION

PAOs are recognized as a class of materials that are exceptionally useful as high performance synthetic lubricant basestocks. They demonstrate excellent flow properties at low temperatures, good thermal and oxidative stability, low evaporation losses at high temperatures, high viscosity indexes, good friction behavior, good hydrolytic stability, and good erosion resistance. PAOs are miscible with mineral oils, synthetic hydrocarbon liquids, and esters. Consequently, PAOs are suitable for use in engine oils, compressor oils, hydraulic oils, gear oils, greases, and functional fluids.

Olefin polymerization catalysts are of great use in industry. Hence there is interest in finding new catalysts that increase the commercial usefulness of the catalyst and produce polymers having improved properties. Various catalysts exist for the polymerization of olefins. Friedel-Craft catalysts, such as aluminum trichloride or boron trifluoride, and a protic promoter have traditionally been used. The demand for high quality PAOs has been increasing for several years, however, driving research into alternatives to the Friedel-Craft process.

Metallocene catalyst systems are one such alternative. Most of the metallocene focus has been on high-viscosity-index-PAOs (HVI-PAOs) and higher viscosity oils for industrial and commercial applications. Examples include U.S. Pat. No. 6,706,828, which discloses a process for producing PAOs from meso-forms of certain metallocene catalysts with methylalumoxane (MAO). Others have made various PAOs using various metallocene catalysts not typically known to produce polymers or oligomers with any specific tacticity. Examples include U.S. Pat. Nos. 5,688,887; 6,043,401; 5,087,788; 6,414,090; 6,414,091; 4,704,491; 6,133,209; 6,548,724; and 6,713,438.

A relatively smaller amount of focus has been on making PAOs using a specific type of metallocene catalyst comprising only one cyclopentadienyl ("Cp") ring. These metallocene catalysts are often referred to as "mono-Cp" or "half-sandwich" metallocene catalyst compounds. Mono-Cp metallocene compounds are compounds in which one of the Cp ligands has been replaced by an anionic ligand fulfilling similar coordination-chemical purposes. The active species in bis-Cp metallocene compounds is the 14-electron cation $[Cp_2MR]_+$. The replacement of one Cp ligand by an alkyl group in a mono-Cp compound provides the 10-electron cation $[CpMR_2]_+$ as the active species. Such a species is more electron deficient, sterically less hindered, and possesses two, rather than one, vacant coordination sites for monomer binding. As such, the catalytic behavior of mono-Cp metallocene compounds is generally expected to be different from related bis-Cp metallocene compounds.

The additional Cp group as a ligand for bis-Cp metallocene catalysts stabilizes the active catalyst site and exerts steric and electronic influences that affect catalyst performance and characteristics of the PAO formed. Some aspects of the role of this second Cp ligand may be filled by other ligands, however, different ligands may cause otherwise similar catalysts to operate differently. Mono-Cp titanium-based metallocene compounds comprising a bridging group, aromatic group, and additional $R_2$ ligands were disclosed as polymerization catalysts in J Saβmannshausen et al., J. Organomet. Chem. 1999, 592, 84-92. However, the reference indicates that the effect of a comparatively weakly coordinated pendant ligand, such as phenyl, on the behavior of the polymerization catalyst is difficult to predict. U.S. Pat. No. 7,056,995 discloses the use of similar catalysts for the trimerization of low molecular weight olefins, primarily ethylene, to selectively obtain 1-hexene, but does not demonstrate that these catalysts can be used to obtain higher molecular weight PAOs. Other examples of Mono-Cp catalysts include U.S. Pat. No. RE40234E (mono-Cp compounds useful for producing crystalline PAOs, particularly polypropylene), U.S. Pat. No. 5,043,515 (unbridged mono-Cp catalysts comprising zirconocene and one or more alkyl aluminoxanes, primarily useful for the polymerization of low molecular weight monomers, specifically ethylene), and U.S. Pat. No. 7,279,609 (mono-Cp catalysts useful for alpha-olefin trimerization comprising extractable counter-ions which are preferably halogens, especially chlorine). Additional examples include U.S. Pat. Nos. 5,171,919 and 6,680,417 and U.S. Patent Application Publications 2004/0038806; 2006/0183631; and 2009/0036621.

There is still a need for new and improved catalysts for the polymerization of olefins to achieve specific olefin properties, increase conversion rates, improve efficiency or economics, and/or provide greater industry flexibility. Specifically, there is a need for new processes and catalysts for making high viscosity PAOs with narrow molecular weight distribution (MWD), this latter attribute indicative that the PAO will demonstrate improved shear stability in lubricant formulations. Shear instability may lead to permanent viscosity losses in lubricants, which can have an undesired impact on lubricant performance and life, equipment downtime, and equipment life. The present invention is directed to new catalysts useful for producing high viscosity PAOs with improved shear stability.

SUMMARY OF THE INVENTION

This invention is directed to new mono-cyclopentadienyl ("mono-Cp") metallocene catalyst compounds useful for producing high viscosity PAOs with narrow MWD and improved shear stability. In an embodiment, this invention relates to a group of bridged mono-Cp catalysts comprising an aromatic ring, wherein the aromatic ring is substituted with: 1) at least one phenyl group, 2) at least one alkyl group, and 3) at least one other group, such as a hydrocarbyl group, a heteroatom, or a heteroatom-containing group.

In an embodiment of the invention, the catalyst compound is represented by the following formula:

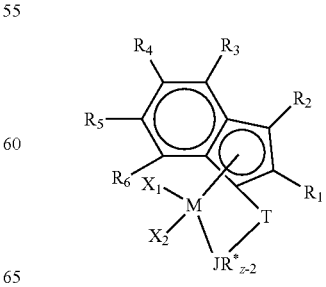

wherein:
  M is a Group 4 transition Metal, preferably Hf, Ti, or Zr;
  each $X_1$ and $X_2$ is independently selected from the group consisting of hydrocarbyl radicals having from 1 to 20 carbon atoms, hydrides, amides, alkoxides, sulfides, phosphides, halides, dienes, amines, phosphines, ethers, and a combination thereof, and two X's may form a part of a fused ring or a ring system; preferably, each X is independently selected from halides and methyl groups;
  T is a bridging group, preferably comprising Si, Ge, or C;
  $JR^*_{z-2}$ is a ligand comprising a heteroatom, wherein the heteroatom is an element with a coordination number of three from Group 15 or an element with a coordination number of two from Group 16, preferably N, P, O, or S;
  z is the coordination number of the element J;
  each R' is independently selected from the group consisting of hydrocarbyl radicals having from 1 to 20 carbon atoms, hydrides, amides, alkoxides, sulfides, phosphides, halides, dienes, amines, phosphines, ethers, and a combination thereof;
  each $R_1$, $R_2$, $R_3$, $R_4$, $R_5$, and $R_6$ is independently hydrogen, a substituted or unsubstituted hydrocarbyl group, or a heteroatom, provided that any adjacent $R_1$, $R_2$, $R_3$, $R_4$, $R_5$, and $R_6$ groups may form a fused ring or multicenter fused ring system where the rings may be aromatic, partially saturated, or saturated; at least one of $R_1$, $R_2$, $R_3$, $R_4$, $R_5$, and $R_6$ is an aromatic group, preferably phenyl; at least one of $R_1$, $R_2$, $R_3$, $R_4$, $R_5$, and $R_6$ is an alkyl group, preferably methyl.

In an embodiment of the invention, the catalyst compound is represented by the following formula:

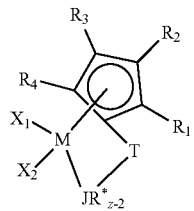

wherein:
  M, $X_1$, $X_2$, T, and $JR^*_{z-2}$ are as described above; and
  each $R_1$, $R_2$, $R_3$, and $R_4$ is independently hydrogen, a substituted or unsubstituted hydrocarbyl group, or a heteroatom, provided that any adjacent $R_1$, $R_2$, $R_3$, and $R_4$ groups may form a fused ring or multicenter fused ring system where the rings may be aromatic, partially saturated, or saturated.

These new catalysts are useful for the production of high viscosity PAOs with a narrow MWD and improved shear stability. PAOs with a kinematic viscosity at 100° C. from 150 to 600 cSt and a viscosity index above 100 can be produced. These PAOs have MWDs generally less than 1.65, and greatly reduced, if not eliminated, permanent viscosity losses due to shearing in lube formulations.

DETAILED DESCRIPTION OF THE INVENTION

For the purpose of this disclosure, the new numbering scheme for the Periodic Table Groups is used as in CHEMICAL AND ENGINEERING NEWS, 63(5), pg. 27 (1985).

While it is recognized that polymerization generally refers to the conversion of monomers to a finite degree of polymerization, the terms "polymerization" and "oligomerization" are used interchangeably in this disclosure and the advantages of this invention are useful in either type of reaction.

This invention is directed to new mono-cyclopentadienyl ("mono-Cp") metallocene catalyst compounds useful for producing high viscosity PAOs with narrow MWD and improved shear stability. The monomer feed used in the polymerization process typically comprises monomers of 6 to 24 carbon atoms, usually 6 to 20, and preferably 6 to 14 carbon atoms. Olefins with even carbon numbers are preferred, as are linear alpha olefins (LAOs). Thus, 1-hexene, 1-octene, 1-decene, 1-dodecene, 1-tetradecene, and mixtures thereof are preferred. Additionally, the monomer feeds are preferably pretreated to remove catalyst poisons, such as peroxides, oxygen, sulfur, nitrogen-containing organic compounds, and/or acetylenic compounds as described in WO 2007/011973. In a preferred embodiment of the invention, the monomer feed does not contain monomers of less than 6 carbon atoms, and thus does not contain ethylene, propylene, or butene.

Catalyst

When used herein, the term "catalyst system" is defined to mean the metallocene catalyst, at least one activator, an optional co-activator, as well as any sorbent or diluent used in conjunction with these components. The term "catalyst components" may be used interchangeably with the term "catalyst system."

For purposes of this disclosure, hydrocarbyl radicals are $C_1$-$C_{100}$ radicals and may be linear, branched, or cyclic.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-hydrocarbon atom or group has been inserted within the hydrocarbyl radical, such as —O—, —O—, —Se—, —Te—, —N($R^*$)—, =N—, —P($R^*$)—, =P—, —As($R^*$)—, =As—, —Sb($R^*$)—, =Sb—, —B($R^*$)—, =B—, —Si($R^*$)$_2$—, —Ge($R^*$)$_2$—, —Sn($R^*$)$_2$—, —Pb($R^*$)$_2$—, and the like, where $R^*$ is independently a hydrocarbyl or halocarbyl radical, and two or more $R^*$ may join together to form a substituted or unsubstituted saturated, partially unsaturated or aromatic cyclic or polycyclic ring structure. A substituted hydrocarbyl radical includes halocarbyl radicals, substituted halocarbyl radicals, silylcarbyl radicals, and germylcarbyl radicals as these terms are defined below.

Halocarbyl radicals are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-carbon atom or group has been inserted within the halocarbyl radical such as —O—, —S—, —Se—, —Te—; —N($R^*$)—, =N—, —P($R^*$)—, =P—, —As($R^*$)—, =As—, —Sb($R^*$)—, =Sb—, —B($R^*$)—, =B—, —Si($R^*$)$_2$—, —Ge($R^*$)$_2$—, —Sn($R^*$)$_2$—, —Pb($R^*$)$_2$—, and the like, where $R^*$ is independently a hydrocarbyl or halocarbyl radical provided that at least one halogen atom remains on the original halocarbyl radical. Additionally, two or more $R^*$ may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R^*$, $SiHR^*$—), $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where $R^*$ is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^5_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where R* is independently a hydrocarbyl or halocarbyl radical and two or more R* may join together to form a substituted or unsubstituted saturated, partially unsaturated or aromatic cyclic or polycyclic ring structure.

In an embodiment of the invention, the catalyst compound is represented by the following formula:

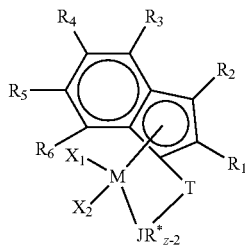

wherein:

M is a Group 4 transition metal, preferably Hf, Ti, or Zr;

each $X_1$ and $X_2$ is independently selected from the group consisting of substituted or unsubstituted hydrocarbyl radicals having from 1 to 20 carbon atoms, hydrides, amides, alkoxides, sulfides, phosphides, halides, dienes, amines, phosphines, ethers, and a combination thereof, and $X_1$ and $X_2$ may form a part of a fused ring or a ring system; preferably, each $X_1$ and $X_2$ is independently selected from halides and methyl groups;

R is a bridging group, preferably comprising Si, Ge, or C;

$JR^*_{z-2}$ is a ligand comprising a heteroatom, wherein the heteroatom is an element with a coordination number of three from Group 15 or an element with a coordination number of two from Group 16, preferably N, P, O, or S;

z is the coordination number of the element J;

each R* is independently selected from the group consisting of substituted or unsubstituted hydrocarbyl radicals having from 1 to 20 carbon atoms, hydrides, amides, alkoxides, sulfides, phosphides, halides, dienes, amines, phosphines, ethers, and a combination thereof; and each $R_1$, $R_2$, $R_3$, $R_4$, $R_5$, and $R_6$ is independently hydrogen, a substituted or unsubstituted hydrocarbyl group, or a heteroatom, provided that any adjacent $R_1$, $R_2$, $R_3$, $R_4$, $R_5$, and $R_6$ groups may form a fused ring or multicenter fused ring system where the rings may be aromatic, partially saturated, or saturated.

Examples of additional bridging groups, T, useful herein may be represented by $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'2CSiR'_2$, $R'2SiSiR'_2$, $R_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C-BR'$, $R'_2C-BR'-CR'_2$, $R'_2C-O-CR'_2$, $R'_2CR'_2C-O-CR'_2CR'_2$, $R'_2C-O-CR'_2CR'_2$, $R'_2C-O-CR'=CR'$, $R'C-S-CR'_2$, $R'_2CR'_2C-S-CR'_2CR'_2$, $R'_2C-S-CR'_2CR'_2$, $R'_2C-S-CR'=CR'$, $R'_2C-Se-CR'_2$, $R'_2CR'_2C-Se-CR'_2CR'_2$, $R'_2C-Se-CR_2CR'_2$, $R'_2C-Se-CR'=CR'$, $R'_2C-N=CR'$, $R'C-NR'-CR'_2$, $R'_2C-NR'-CR'_2CR'_2$, $R'_2C-NR'-CR'=CR'$, $R'_2CR'_2C-NR'-CR'_2CR'_2$, $R'_2C-P=CR'$, and $R'_2C-PR'-CR'_2$ where R' is hydrogen or a $C_1$ to $C_{20}$ containing hydrocarbyl, substituted hydrocarbyl, halocarbyl, substituted halocarbyl, silylcarbyl or germylcarbyl substituent, and optionally two or more adjacent R' may join to form a substituted or unsubstituted, saturated, partially unsaturated or aromatic, cyclic or polycyclic substituent. In a preferred embodiment of the invention, T is a bridging group comprising C or S, such as dialkylsilyl. In another preferred embodiment of the invention, T is selected from $CH_2$, $CH_2CH_2$, $C(CH_3)_2$, $SiMe_2$, $SiPh_2$, $SiMePh$, silylcyclobutyl ($Si(CH_2)_3$), $(Ph)_2C$, $(p-(Et)_3SiPh)_2C$, and silylcyclopentyl ($Si(CH_2)_4$).

In an embodiment, at least one of $R_1$, $R_2$, $R_3$, $R_4$, $R_5$, and $R_6$ is phenyl, and at least one of $R_1$, $R_2$, $R_3$, $R_4$, $R_5$, and $R_6$ is an alkyl group, preferably methyl. In an embodiment of the invention, $R_3$ is phenyl. In an embodiment of the invention, the phenyl ring is substituted with at least one alkyl halide, preferably a tri-halide. In an embodiment of the invention, this tri-halide is tri-fluoride. In an embodiment of the invention, the tri-halide is at the meta position on the phenyl ring. In an embodiment of the invention, the phenyl ring is substituted with at least one alkyl group, preferably a methyl group. In an embodiment of the invention, an alkyl group is at the ortho position on the phenyl ring. In an embodiment of the invention, $R_1$ is methyl.

In an embodiment of the invention, the catalyst compound is represented by the following formula:

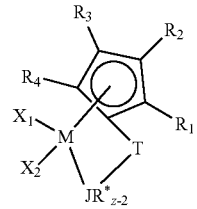

wherein:

M, $X_1$, $X_2$, T, and $JR^*_{z-2}$ are as described above; and each $R_1$, $R_2$, $R_3$, and $R_4$ is independently hydrogen, a substituted or unsubstituted hydrocarbyl group, or a heteroatom, provided that any adjacent $R_1$, $R_2$, $R_3$, and $R_4$ groups may form a fused ring or multicenter fused ring system where the rings may be aromatic, partially saturated, or saturated.

In an embodiment, at least one of $R_1$, $R_2$, $R_3$, and $R_4$ is phenyl, and at least one of $R_1$, $R_2$, $R_3$, and $R_4$ is an alkyl group. In an embodiment of the invention, the phenyl ring is substituted with at least one alkyl halide, preferably a tri-halide. In an embodiment of the invention, this tri-halide is tri-fluoride. In an embodiment of the invention, the tri-halide is at the meta position on the phenyl ring. In an embodiment of the invention, the phenyl ring is substituted with at least one alkyl group, preferably a methyl group. In an embodiment of the invention, an alkyl group is at the ortho position on the phenyl ring. In an embodiment of the invention, $R_1$ is methyl.

Activator

The catalyst may be activated by an activator such as a non-coordinating anion (NCA). An NCA is an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the NCA. Suitable metals include, but are not limited to, aluminum, gold, and platinum. Suitable metalloids include, but are not limited to, boron, aluminum, phosphorus, and silicon.

In a preferred embodiment of the invention, boron containing NCA activators represented by the formula below can be used:

$$Z_d^+(A^{d-})$$

wherein:

Z is (L-H) or a reducible Lewis acid; L is a neutral Lewis base; H is hydrogen; (L-H) is a Brønsted acid; $A^{d-}$ is a boron containing NCA having the charge d−; d is 1, 2, or 3.

The cation component, $Z_d^+$ may include Brønsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. In a preferred embodiment of the invention, $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Brønsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers, tetrahydrothiophene, and mixtures thereof.

The anion component $A^{d-}$ includes those having the formula $[Mk+Qn]^{d-}$ wherein k is 1, 2, or 3; n is 1, 2, 3, 4, 5, or 6 (preferably 1, 2, 3, or 4); n−k=d; M is an element selected from Group 13, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Examples of boron compounds which may be used are the compounds described as (and particularly those specifically listed as) activators in U.S. Ser. No. 61/494,730, filed Jun. 8, 2011, which is incorporated by reference herein.

Most preferably, the ionic stoichiometric activator $Z_d^+$ $(A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(pentaflourophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

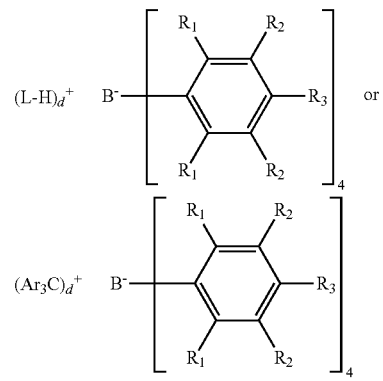

wherein:

Ar is a substituted or unsubstituted aryl group (preferably a substituted or unsubstituted phenyl), preferably substituted with $C_1$ to $C_{40}$ hydrocarbyls, $C_1$ to $C_{20}$ alkyls, or aromatics;

each $R_1$ is independently a halide, preferably a fluoride;

each $R_2$ is independently a halide, a $C_6$ to $C_{20}$ substituted aromatic hydrocarbyl group or a siloxy group of the formula —O—Si—Ra, where Ra is a $C_1$ to $C_{20}$ hydrocarbyl or hydrocarbylsilyl group (preferably $R_2$ is a fluoride or a perfluorinated phenyl group);

each $R_3$ is independently a halide, a $C_6$ to $C_{20}$ substituted aromatic hydrocarbyl group or a siloxy group of the formula —O—Si—Ra, where Ra is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is a neutral Lewis base; $(L-H)_d^+$ is a Brønsted acid; d is 1, 2, or 3;

wherein the anion has a molecular weight of greater than 1020 g/mol;

wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, or $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3Vs$, where Vs is the scaled volume. Vs is the sum of the relative volumes of the constituent atoms, and is calculated from the molecular formula of the substituent using the following table of relative volumes. For fused rings, the Vs is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

Additional useful Bulky activators are listed in U.S. Ser. No. 61/494,730, filed Jun. 8, 2011, which is incorporated by reference herein. Additional useful NCAs are listed in U.S. Pat. No. 6,211,105, which is also incorporated by reference herein.

Additional activators that may be useful include alumoxanes or alumoxanes in combination with an NCA. In an embodiment of the invention, alumoxane activators are utilized as an activator. Alumoxanes are generally oligomeric compounds containing —Al($R_1$)—O— sub-units, where $R_1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used.

In an embodiment of the invention, no alumoxane is present in the process. In this embodiment of the invention, alumoxane, if present at all, is present at preferably not more than 0.001 mol %, based on the mol % of all catalyst components.

Co-Activator

A catalyst co-activator is a compound capable of alkylating the catalyst, such that when used in combination with an activator, an active catalyst is formed. Co-activators may include alumoxanes such as methylalumoxane, modified alumoxanes such as modified methylalumoxane, and aluminum alkyls such trimethylaluminum, tri-isobutylaluminum, tri-ethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the catalyst is not a dihydrocarbyl or dihydride complex.

The co-activator may also be a scavenger to deactivate impurities in feed or reactors. A scavenger is a compound that is sufficiently Lewis acidic to coordinate with polar contaminates and impurities adventitiously occurring in the polymerization feedstocks or reaction medium. Such impurities can be inadvertently introduced with any of the reaction components, and adversely affect catalyst activity and stability. Useful scavenging compounds may be organometallic compounds such as triethyl aluminum, triethyl borane, tri-isobutyl aluminum, methylalumoxane, isobutyl aluminumoxane, tri-n-hexyl aluminum, tri-n-octyl aluminum, and those having bulky substituents covalently bound to the metal or metalloid center being preferred to minimize adverse interaction with the active catalyst. Other useful scavenger compounds may include those mentioned in U.S. Pat. No. 5,241,025, EP-A 0426638, and WO 97/22635, which are incorporated by reference for such details.

Optional Support Materials

In an embodiment of the invention, the catalyst system may comprise an inert support material. Suitable support materials and processes for the use of such materials can be readily determined by one skilled in the art in possession of this disclosure.

Polymerization Process

Many polymerization processes and reactor types commonly used for metallocene-catalyzed polymerizations such as solution, slurry, and bulk polymerization processes may be used in this invention. Homogeneous polymerization processes are preferred. A homogeneous polymerization process is defined as a process where at least 90 wt % of the product is soluble in the reaction media. A bulk homogeneous process is particularly preferred. A bulk homogeneous process is defined to be a process where monomer concentration in all feeds to the reactor is 70 volume % or more. Slurry polymerization processes may also be used. A slurry polymerization process is defined as a process where a supported catalyst is employed and monomers are polymerized on the supported catalyst particles. At least 95 wt % of polymer products derived from the supported catalyst are in granular form as solid particles and not dissolved in the diluent. In some embodiments of the invention, if a solid catalyst is used, a slurry or continuous fixed bed or plug flow process is suitable. In an embodiment of the invention, the monomers are contacted with the metallocene compound and the activator in the solution phase, bulk phase, or slurry phase, preferably in a continuous stirred tank reactor or a continuous tubular reactor.

In an embodiment of the invention, solvent or diluent is present in the reactor. Suitable diluents/solvents for polymerization include non-coordinating, inert liquids. Examples include butanes, pentanes, hexanes, heptanes, octanes, nonanes, decanes, undecanes, dodecanes, tridecanes, tetradecanes, pentadecanes, hexadecanes, toluene, o-xylene, m-xylene, p-xylene, mixed xylenes, ethylbenzene, isopropylbenzene, and n-butylbenzene; preferably toluene and/or xylenes and or ethylbenzene, normal paraffins (such as Norpar™ solvents available from ExxonMobil Chemical Company in Houston, Tex.), or isoparaffin solvents (such as Isopar™ solvents available from ExxonMobil Chemical Company in Houston, Tex.). These solvents or diluents are usually pretreated in the same manners as the feed olefins. Alternately, no solvent or diluent is present or added in the reaction medium, except for the small amounts used as the carrier for the catalyst system or other additives, or amounts typically found with the monomer.

In an embodiment of the invention, the temperature in any reactor used herein is from −10° C. to 300° C., preferably from 25° C. to 200° C., and more preferably from 60° C. to 150° C. To produce fluids with narrow MWD to obtain the highest possible shear stability, it is useful to control the reaction temperature to obtain minimum temperature fluctuation in the reactor over the course of the reaction. If multiple reactors are used in series or parallel, it is useful to keep the temperature constant at a pre-determined value.

In an embodiment of the invention, the pressure in any reactor used herein is from 0.1 to 100 atmospheres (1.5 to 1500 psi), preferably from 0.5 to 75 atmospheres (8 to 1125 psi), and most preferably from 1 to 50 atmospheres (15 to 750 psi). In an embodiment of the invention, the pressure in any reactor used herein is from 1 to 50,000 atmospheres, preferably 1 to 25,000 atmospheres.

In an embodiment of the invention, the residence time in any reactor is 1 second to 100 hours, preferably 30 seconds to 50 hours, preferably 2 minutes to 6 hours, preferably 1 to 6 hours.

The monomer feed and catalyst components, the latter optionally dissolved or suspended in solvents, such as toluene or other aromatic or aliphatic solvents, or in the feed monomers, are fed into the reactor under inert atmosphere (usually nitrogen or argon blanketed atmosphere). In such an inert atmosphere, the catalyst and feed components will not be in contact with any catalyst deactivator or poison, which is usually polar oxygen, nitrogen, sulfur, or acetylenic compounds. Additionally, in an embodiment of the invention, the feed monomers and/or solvents are pre-treated to remove catalyst poisons, such as peroxides, oxygen or nitrogen-containing organic compounds, and/or acetylenic compounds.

The polymerization can be run in batch mode, where all the components are added into a reactor and allowed to react to a degree of conversion, either partial or full conversion. Subsequently, the catalyst is deactivated by any possible means, such as exposure to air or water, or by addition of alcohols or solvents containing deactivating agents. The polymerization can also be run in semi-continuous operation, where feed monomers and catalyst components are continuously and simultaneously added to the reactor so as to maintain a constant ratio of catalyst components to feed monomers. When all feeds and catalyst components are added, the reaction is allowed to proceed to a pre-determined stage. The catalyst is then deactivated in the same manner as described for batch operation. The polymerization can also be run in continuous operation, where feeds and catalyst components are continuously and simultaneously added to the reactor so to maintain a constant ratio of catalyst components and feeds. The reaction product is continuously withdrawn from the reactor, as in a typical continuous stirred tank reactor (CSTR) operation. The withdrawn product is then typically quenched in the separate reactor in a similar manner as other operations. In an embodiment of the invention, any of the processes to prepare PAOs described herein are continuous processes.

A production facility may have one single reactor or several reactors arranged in series or in parallel, or both, to maximize productivity, product properties, and general process efficiency. The catalyst components may be delivered as a solution or slurry in a solvent or in the monomer feed stream, either separately to the reactor, activated in-line just prior to the reactor, or pre-activated and pumped as an activated solution or slurry to the reactor. Polymerizations are carried out in either single reactor operation, in which the monomer or monomers, catalyst components, optional scavenger, and any other components are added continuously to a single reactor or in series reactor operation, in which the above components are added to each of two or more reactors connected in series. The catalyst components can be added to the first reactor in the series. The catalyst components may also be added to both reactors, with one component being added to the first reaction and another component to other reactors.

Sometimes a small amount of hydrogen is added to the reactor to improve the catalyst. The amount of hydrogen is preferred to keep at such a level to improve catalyst productivity, but not induce any hydrogenation of olefins, especially any feed alpha-olefins because the conversion of alpha-olefins into saturated paraffins is very detrimental to the efficiency of the process. In an embodiment of the invention, the process comprises maintaining a partial pressure of hydrogen in the reactor of 200 psi (1379 kPa) or less, based upon the total pressure of the reactor, preferably 150 psi (1034 kPa) or less, preferably 100 psi (690 kPa) or less, preferably 50 psi (345 kPa) or less, preferably 25 psi (173 kPa) or less, and preferably 10 psi (69 kPa) or less. Alternately the hydrogen, if present is present in the reactor at 500 ppm or less by weight, preferably 250 ppm or less, preferably 200 ppm or less, preferably 150 ppm or less, preferably 100 ppm or less, preferably 50 ppm or less, preferably 25 ppm or less, preferably 10 ppm or less, and preferably 5 ppm or less.

Other additives may also be used in the polymerization, as desired, such as one or more scavengers, promoters, modifiers, chain transfer agents, reducing agents, oxidizing agents, hydrogen, aluminum alkyls, or silanes.

Polymerization Products

In a preferred embodiment of the invention, the products produced herein are PAOs of at least one monomer of a $C_6$ to $C_{24}$ alpha-olefin, usually a $C_6$ to $C_{20}$ alpha-olefin, and preferably a $C_6$ to $C_{14}$ alpha-olefin. PAOs of even carbon numbers alpha-olefins are preferred, as are PAOs of linear alpha olefins (LAOs). Thus, PAOs of 1-hexene, 1-octene, 1-decene, 1-dodecene, 1-tetradecene, and mixtures thereof are preferred. In a preferred embodiment of the invention, the PAOs comprise less than about 5 wt %, preferably less than about 2 wt %, and preferably about 0 wt % of ethylene-, propylene-, or butene-derived units.

In an embodiment of the invention, the kinematic viscosity at 100° C. of the PAOs produced ranges from about 150 to about 600 cSt, about 150 to about 300 cSt, or about 300 to about 600 cSt.

In an embodiment of the invention, the viscosity index of the PAO is more than 100, preferably more than 110, preferably more than 120, and preferably more than 130.

In an embodiment of the invention, the weight average molecular weight, Mw, is between 5,000 and 750,000 g/mol, between 5,000 and 500,000 g/mol, between 5,000 and 250,000 g/mol, between 5,000 and 100,000 g/mol, between 5,000 and 50,000 g/mol, or between 5,000 and 30,000 g/mol. In another embodiment of the invention, the weight average molecular weight, Mw, is between 2,500 and 250,000 g/mol, between 2,500 and 100,000 g/mol, between 2,500 and 50,000 g/mol, or between 2,500 and 30,000 g/mol.

In an embodiment of the invention, the molecular weight distribution ("MWD", Mw/Mn) is 2 or below, preferably 1.80 or below, preferably 1.70 or below, preferably 1.65 or below, preferably 1.60 or below, and preferably 1.50 or below.

The PAOs produced herein may be combined with one or more of viscosity index improvers, dispersants, detergents, friction modifiers, traction modifiers, demulsifiers, defoamants, antiwear or antirust additives, chromophores (dyes), haze inhibitors, or any other additives commonly used in lubricant formulations.

The PAOs produced herein are useful in numerous finished lubricant formulations, non-limiting examples which include formulations for engine oils, gear and transmission oils, industrial oils, greases, and turbine oils. Additional information on the use of PAOs in the formulations of full synthetic, semi-synthetic, or part synthetic lubricant or functional fluids can be found in "Synthetic Lubricants and High-Performance Functional Fluids", 2nd Ed. L. Rudnick, etc. Marcel Dekker, Inc., N.Y. (1999).

EXAMPLES

The foregoing examples are provided to demonstrate particular embodiments of the invention. One skilled in the art would readily understand that additional embodiments are possible without departing from the basic scope of the invention.

In this disclosure, except as otherwise stated, Mw, Mn, and MWD are determined by Gas Permeation Chromatography (GPC) as described in U.S. Patent Application Publication 2008/0045638, and these details are incorporated herein by reference. Kinematic viscosity is measured by ASTM D 445. Viscosity index is measured by ASTM D 2270.

All examples are conducted using a small-scale, high throughput reactor apparatus (hereinafter "the reactor apparatus"). The reactor apparatus is a stainless steel reactor fitted with a glass liner, containing an agitator and temperature controller, and having a total reactor volume of 5.5 mL. Given the small scale of the reactor apparatus, multiple experiments with the same catalyst and similar reaction conditions were conducted to demonstrate repeatability and reliability of the results achieved.

Examples 1a and 1b

Examples 1a and 1b were conducted according to the following process. A purified 1-decene feed of about 3 grams was added to the reactor apparatus under an inert atmosphere of nitrogen. Following this, about 2 micromole of tri-n-octylaluminum and 0.04 micromole of N,N-dimethylanilinium tetrakis(perfluorophenyl)borate solution at 1 micromole/liter was added to the reactor apparatus. The reactor apparatus was heated to a temperature of 100° C., and then 0.04 micromole of dimethylsilyl(2-methyl, 4-m-$CF_3$-phenyl indenyl)(t-butyl amido) titanium dimethyl solution (hereinafter "Catalyst 1") at 1 micromole/liter was added. After 1.5 hours, the reaction was quenched by addition to the reactor apparatus of an amount of carbon dioxide ($CO_2$) gas of equal moles to the amount of catalyst added. The PAO product was isolated by stripping the reactor contents from about 23° C. to about 50° C. under high vacuum pressure for at least two hours to remove solvent, unreacted starting material, and dimer (i.e., any component having less than 30 carbon atoms). The PAO properties, including Mw/Mn, were analyzed by GPC using tetrahydrofuran as the solvent and polystyrene as the calibration standard. Results are summarized in Table 1.

Examples 2a and 2b

Examples 2a and 2b were conducted identical to Examples 1a and 1b, except that the reactor apparatus was heated to a temperature of 120° C. prior to adding the catalyst. Results are summarized in Table 1.

Examples 3a and 3b

Examples 3a and 3b were conducted identical to Examples 1a and 1b, except that the catalyst was dimethylsilyl(2-methyl, 4-o-methyl-phenyl indenyl)(t-butyl amido) titanium dimethyl solution (hereinafter "Catalyst 2"). Results are summarized in Table 1.

Examples 4a and 4b

Examples 4a and 4b were conducted identical to Examples 2a and 2b, except that the reactor apparatus was heated to only 80° C. prior to adding the catalyst. Results are summarized in Table 1.

Examples 5a and 5b

Examples 5a and 5b were conducted identical to Examples 2a and 2b, except that the reactor apparatus was heated to 120° C. prior to adding the catalyst. Results are summarized in Table 1.

TABLE 1

Table 1: Process and Product Data for PAOs Made from Inventive Catalysts

| Example | Catalyst | Temp (° C.) | Mw (g/mol) | Mn | MWD (Mw/Mn) |
|---|---|---|---|---|---|
| 1a | 1 | 100 | 32,588 | 20,465 | 1.59 |
| 1b | 1 | 100 | 37,806 | 23,187 | 1.63 |
| 2a | 1 | 120 | 14,692 | 9,087 | 1.62 |
| 2b | 1 | 120 | 17,182 | 10,499 | 1.64 |
| 3a | 2 | 100 | 20,097 | 12,704 | 1.58 |
| 3b | 2 | 100 | 20,236 | 12,570 | 1.61 |
| 4a | 2 | 80 | 27,948 | 17,962 | 1.56 |
| 4b | 2 | 80 | 27,725 | 17,560 | 1.57 |
| 5a | 2 | 120 | 11,622 | 7,303 | 1.59 |
| 5b | 2 | 120 | 10,964 | 6,870 | 1.60 |

What is claimed is:

1. A process to produce a polyalpha-olefin (PAO), the process comprising contacting a catalyst, at least one activator, optionally at least one co-activator, and at least one monomer in a reactor, wherein the catalyst is represented by the following formula:

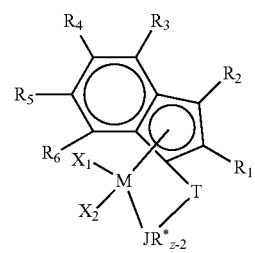

wherein:
M is a Group 4 transition metal;
T is a bridging group;
each $X_1$ and $X_2$ is independently selected from the group consisting of substituted or unsubstituted hydrocarbyl radicals having from 1 to 20 carbon atoms, hydrides, amides, alkoxides, sulfides, phosphides, halides, dienes, amines, phosphines, ethers, and a combination thereof, and $X_1$ and $X_2$ optionally form a part of a fused ring or a ring system;
each $X_1$ and $X_2$ is independently selected from halides and methyl groups;
$JR^*_{z-2}$ is a ligand comprising a heteroatom J, wherein the heteroatom J is an element with a coordination number of three from Group 15 or an element with a coordination number of two from Group 16;

z is the coordination number of the element J;

each R* is independently selected from the group consisting of substituted or unsubstituted hydrocarbyl radicals having from 1 to 20 carbon atoms, hydrides, amides, alkoxides, sulfides, phosphides, halides, dienes, amines, phosphines, ethers, and a combination thereof; and each $R_1$, $R_2$, $R_3$, $R_4$, $R_5$, and $R_6$ is independently hydrogen, a substituted or unsubstituted hydrocarbyl group, or a heteroatom, provided that any adjacent $R_1$, $R_2$, $R_3$, $R_4$, $R_5$, and $R_6$ groups optionally form a fused ring or multicenter fused ring system where the rings are optionally aromatic, partially saturated, or saturated; and wherein the molecular weight distribution, Mw/Mn, of the PAO produced is no greater than 1.65.

2. The process of claim 1 wherein at least one of $R_1$, $R_2$, $R_3$, $R_4$, $R_5$, and $R_6$ is phenyl.

3. The process of claim 1 wherein $R_3$ is phenyl.

4. The process of claim 1 wherein at least one of $R_1$, $R_2$, $R_3$, $R_4$, $R_5$, and $R_6$ is phenyl and said at least one phenyl is substituted with at least one alkyl halide.

5. The process of claim 4 wherein said at least one alkyl halide is a tri-halide at the meta position on said at least one phenyl.

6. The process of claim 1 wherein at least one of $R_1$, $R_2$, $R_3$, $R_4$, $R_5$, and $R_6$ is phenyl and said at least one phenyl is substituted with at least one alkyl group.

7. The process of claim 6 wherein the at least one alkyl group is a methyl group at the ortho position on said at least one phenyl.

8. The process of claim 1 wherein at least one of $R_1$, $R_2$, $R_3$, $R_4$, $R_5$, and $R_6$ is an alkyl group.

9. The process of claim 1 wherein $R_1$ is methyl.

10. A process to produce a polyalpha-olefin (PAO), the process comprising contacting a catalyst, at least one activator, optionally at least one co-activator, and at least one monomer in a reactor, wherein the catalyst is represented by the following formula:

wherein:

M is a Group 4 transition metal;

T is a bridging group;

each $X_1$ and $X_2$ is independently selected from the group consisting of substituted or unsubstituted hydrocarbyl radicals having from 1 to 20 carbon atoms, hydrides, amides, alkoxides, sulfides, phosphides, halides, dienes, amines, phosphines, ethers, and a combination thereof, and $X_1$ and $X_2$ optionally form a part of a fused ring or a ring system;

each $X_1$ and $X_2$ is independently selected from halides and methyl groups;

$JR^*_{z-2}$ is a ligand comprising a heteroatom J, wherein the heteroatom J is an element with a coordination number of three from Group 15 or an element with a coordination number of two from Group 16;

z is the coordination number of the element J;

each R* is independently selected from the group consisting of substituted or unsubstituted hydrocarbyl radicals having from 1 to 20 carbon atoms, hydrides, amides, alkoxides, sulfides, phosphides, halides, dienes, amines, phosphines, ethers, and a combination thereof; and each $R_1$, $R_2$, $R_3$, and $R_4$ is independently hydrogen, a substituted or unsubstituted hydrocarbyl group, or a heteroatom, provided that any adjacent $R_1$, $R_2$, $R_3$, and $R_4$ groups optionally form a fused ring or multicenter fused ring system where the rings are optionally aromatic, partially saturated, or saturated; and wherein the molecular weight distribution, Mw/Mn, of the PAO produced is no greater than 1.65.

11. The process of claim 1 or 10 wherein each $X_1$ and $X_2$ is independently selected from halides and methyl groups.

12. The process of claim 1 or 10 wherein the heteroatom J is preferably N, P, O, or S.

13. The process of claim 1 or 10 wherein the bridging group T is selected from the group comprising R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'2CSiR'$_2$, R'2SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$ to $C_{20}$ containing hydrocarbyl, substituted hydrocarbyl, halocarbyl, substituted halocarbyl, silylcarbyl or germylcarbyl substituent, and optionally two or more adjacent R' may join to form a substituted or unsubstituted, saturated, partially unsaturated or aromatic, cyclic or polycyclic substituent.

14. The process of claim 1 or 10 wherein the kinematic viscosity at 100° C. according to ASTM D 445 of the PAO produced is at least 150 cSt and no greater than 600 cSt.

15. The process of claim 1 or 10 wherein no alumoxane is present in the process.

* * * * *